United States Patent [19]
Waters et al.

[11] Patent Number: 5,639,571
[45] Date of Patent: Jun. 17, 1997

[54] BATTERY PACK

[75] Inventors: John Eugene Waters, Fishers; Andrew Borme, Carmel; Cynthia Lee Conner, Pendleton, all of Ind.

[73] Assignee: General Motors Corporation, Detroit, Mich.

[21] Appl. No.: 668,946

[22] Filed: Jun. 24, 1996

[51] Int. Cl.$^6$ .............................. H01M 2/10; H01M 10/50
[52] U.S. Cl. .............................. 429/71; 429/99; 429/120; 180/68.5
[58] Field of Search .................... 429/71, 72, 99, 429/100, 96, 62, 148, 120; 180/68.5

[56] References Cited

U.S. PATENT DOCUMENTS

| | | | |
|---|---|---|---|
| 1,112,861 | 10/1914 | Snyder | 429/71 |
| 3,745,048 | 7/1973 | Dinkler et al. | 136/166 |
| 5,304,434 | 4/1994 | Stone | 429/99 |
| 5,378,555 | 1/1995 | Waters et al. | 429/97 |
| 5,392,873 | 2/1995 | Masuyama et al. | 180/68.5 |
| 5,456,994 | 10/1995 | Mita | 429/71 |

*Primary Examiner*—Anthony Skapars
*Attorney, Agent, or Firm*—Lawrence B. Plant

[57] ABSTRACT

A battery pack for easy access to, and uniform cooling/heating of, the individual battery modules thereof. The pack comprises stackable housing parts (i.e., top and bottom) housing multiple tiers of battery modules supported by underlying trays having openings/holes therein aligned with gaps/spaces between adjacent battery modules through which cooling/heating air is uniformly flowed in parallel between the modules from an underlying plenum. The battery modules are compressively immobilized in the housing by resilient foam pads which bear down on the tops of the modules.

11 Claims, 6 Drawing Sheets

BATTERY PACK

This invention relates to a battery pack wherein a heating/cooling medium is circulated substantially uniformly between the individual battery modules so as to maintain the temperature of each module at about the same temperature as the other battery modules in the pack.

BACKGROUND OF THE INVENTION

A number of applications require the use of a plurality of rechargeable batteries bundled together in a pack to provide energy for a particular need. In electrically powered vehicles, for example, several battery modules (typically about 12 volts per module) are connected in series to form a high voltage (e.g., 300+volts) battery pack. Such a vehicle pack must not only be sturdy to resist damage on impact, but must be capable of readily accepting or dissipating heat. When such a battery pack is charged or discharged (i.e., receives or delivers electric power respectively) for example, heat is produced which, if uncontrolled, can have a significant impact on the life and performance of the pack as a whole as well as the individual battery modules that form the pack. Temperature stability of the battery modules, individually and as a group, within a defined operating range is essential in maximizing the performance and longevity of a battery pack, and accordingly battery pack thermal management is important to battery pack designers.

It is known to space the individual battery modules from each other and to flow a cooling/heating medium (e.g. air) therebetween to cool or heat the batteries as may be needed. Uncontrolled air flow, however, results in unbalanced air flow such that the air does not flow past each battery at the same rate or same temperature. As a result, significant temperature variances can occur from one battery module to the next which is detrimental to the battery pack's performance and longevity especially some battery modules are allowed to operate at excessive high temperatures. What constitutes "excessively high" will depend on the chemistry of the particular battery. An excessively high temperature for a Pb-acid battery for example is about 65° C. For Pb-acid a desirable operating range is about 25° C. to about 40° C.

SUMMARY OF THE INVENTION

The present invention contemplates a sturdy battery pack suitable for use in an electric vehicle, which pack is designed to support the weight of many batteries resist damage in a vehicle accident and provide substantially the same temperature and flow rate of heating/cooling air between the several battery modules. Substantially uniform/air flow rates between modules and relatively short flow paths (is only a few modules long) results in substantially uniform heating/cooling of all of the individual battery modules in a pack so that no one module is significantly hotter/cooler than the next, and short parallel flow paths insure that the temperature of the heating/cooling air does not progressively build-up as it traverses a long line of battery modules arranged for series such that the last battery module in the series is subjected to significantly hotter/colder air than the first battery in the series. More specifically, the present invention contemplates a battery pack comprising a plurality of individual battery modules stacked in at least first and second tiers one atop the other; a substantially closed housing enclosing the modules and comprising a lower part supporting the modules and a cover overlying the modules; a floor at the bottom of the lower part; a plurality of pedestals upstanding from the floor and supporting a first tray, which tray, together with the floor, define a plenum for conducting heating/cooling air beneath the first tray and thence throughout the pack. A first deck on the first tray supports the first tier of modules, each of which is separated from an adjacent module by a heat transfer gap. A plurality of openings in the deck of the first tray communicate the underlying plenum with the gaps between the modules. A second tray overlies the first tier of modules, and includes a second deck which supports the second tier of modules which are separated from each other by a space between adjacent modules. A plurality of holes in the second deck communicate the spaces between the modules in the second tier with the underlying gaps between the modules in the first tier. Air passes into the plenum an thence flows substantially uniformly between the gaps and spaces via the openings and holes in the trays. An inlet to the housing admits the air to the plenum, and an outlet from the housing exhausts the air from the housing after it has pass through the tiers of battery modules.

The pedestals on the floor of the housing will preferably comprise ribs which extend in a first general direction along the floor to both stiffen/strengthen the housing, and to direct the flow of the air in one direction along the floor beneath the first tray. In an "open-loop" mode of operation the inlet will admit ambient air (e.g., via a fan) into the plenum, and the outlet from the housing will exhaust it back to the ambient. In a "closed-loop" mode of operation, the outlet from the housing will be coupled to the inlet to the fan supplying air to the plenum for continuous recirculation of the air which may then be conditioned (e.g. heated or cooled), as needed, for recirculation to the housing. Both the temperature and/or the flow rate of the air can be varied to vary its heat transferability to/from the battery modules. A small amount (e.g., about 10%) of fresh, ambient air is continuously introduced into the closed-loop system to prevent any build-up of hydrogen gases in the housing.

The battery modules in the first tier rest on the first tray and are held firmly therein by resilient pads which bear down on the top of the battery modules. The second tray is supported by stanchions upstanding from the first tray. The second tier of battery modules are held in place on the second tray by resilient pads bearing down thereon from the cover of the housing.

The same housing may be used with battery modules having different widths. In the case of narrow batteries however, the gap/space between the adjacent battery modules will be wider, and may not be as effective a heat transfer zone as a narrower gap/space. Accordingly, for narrower batteries (i.e., wider inter-module gaps/spaces), baffles or partitions will preferably be placed in the gaps/spaces between adjacent battery modules for better control of air flow and heat transfer to the battery modules.

DETAILED DESCRIPTION OF A PREFERRED EMBODIMENT

The invention will better be understood when considered in the light of the following detailed description of a preferred embodiment thereof which is given hereafter in conjunction with the several drawings in which.

Figure 1:
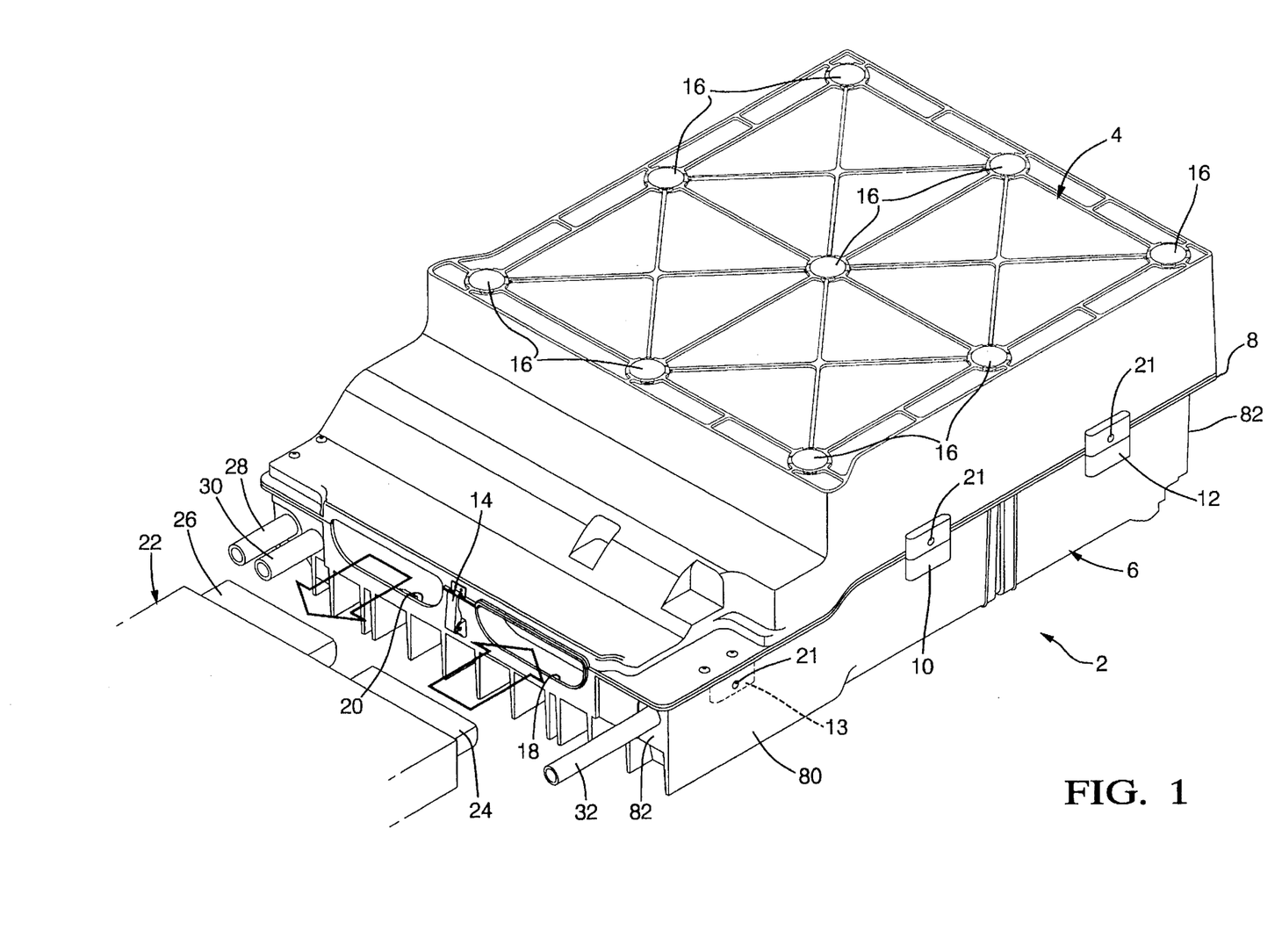
FIG. 1 is a perspective view of a closed battery pack housing in accordance with the present invention.

FIG. 1 depicts a molded battery pack housing 2 having a cover 4 joined to a lower part 6 along the parting line 8, and held together by a plurality of clamps 10, 12, 13, 14, 15, 17 and 19 inter alia, located around the periphery of the housing 2 at the parting line 8. The housing will preferably be molded from a glass-filled polypropylene material. A preferred material is sold by the COMALLOY Company. The clamps 10, 12, 13, 15, 17 and 19 are preferably of the rotary type (i.e., ROTO LOCK® by SOUTHCO). Access openings 21 are provided for inserting a tool into the ROTO LOCK clamp to lock/unlock them. A plurality of microporous flame arrestors 16 are provided in the cover 4 of the housing 2 to permit venting of the interior of the housing while insuring that any flame that might attempt to enter the housing 2 would be immediately quashed.

The housing 2 has an inlet 18 for admitting air into the housing, and an outlet 20 for exhausting air from the housing. The housing 2 may be used in a "open" loop situation wherein ambient air is pumped into the inlet 18, passes through the housing 2 and is exhausted to the ambient via the outlet 20. Preferably, however, the housing 2 will be coupled in "closed-loop" fashion to an air conditioning device 22 (i.e., combined heating, cooling and air flow modulating unit) such that the outlet 24 of the conditioning device 22 supplies the inlet 18 to the housing 2, and the outlet 20 of the housing 2 feeds the inlet 26 to the conditioning device 22 as the air is recirculated through the housing 2. A small amount of fresh air (e.g., about 10% by volume) will be admitted into the "closed-loop" system to prevent hydrogen build-up therein. Power cables 28 and 30 exit the treatment housing 2 for connecting the battery pack therein to an appropriate load (e.g., an electric motor for propelling an electric vehicle). An electrical wiring harness 32 communicates battery pack sensors and controls (not shown) in the pack with the conditioning device 22 for controlling proper air temperature and flow rate.

Figure 2:
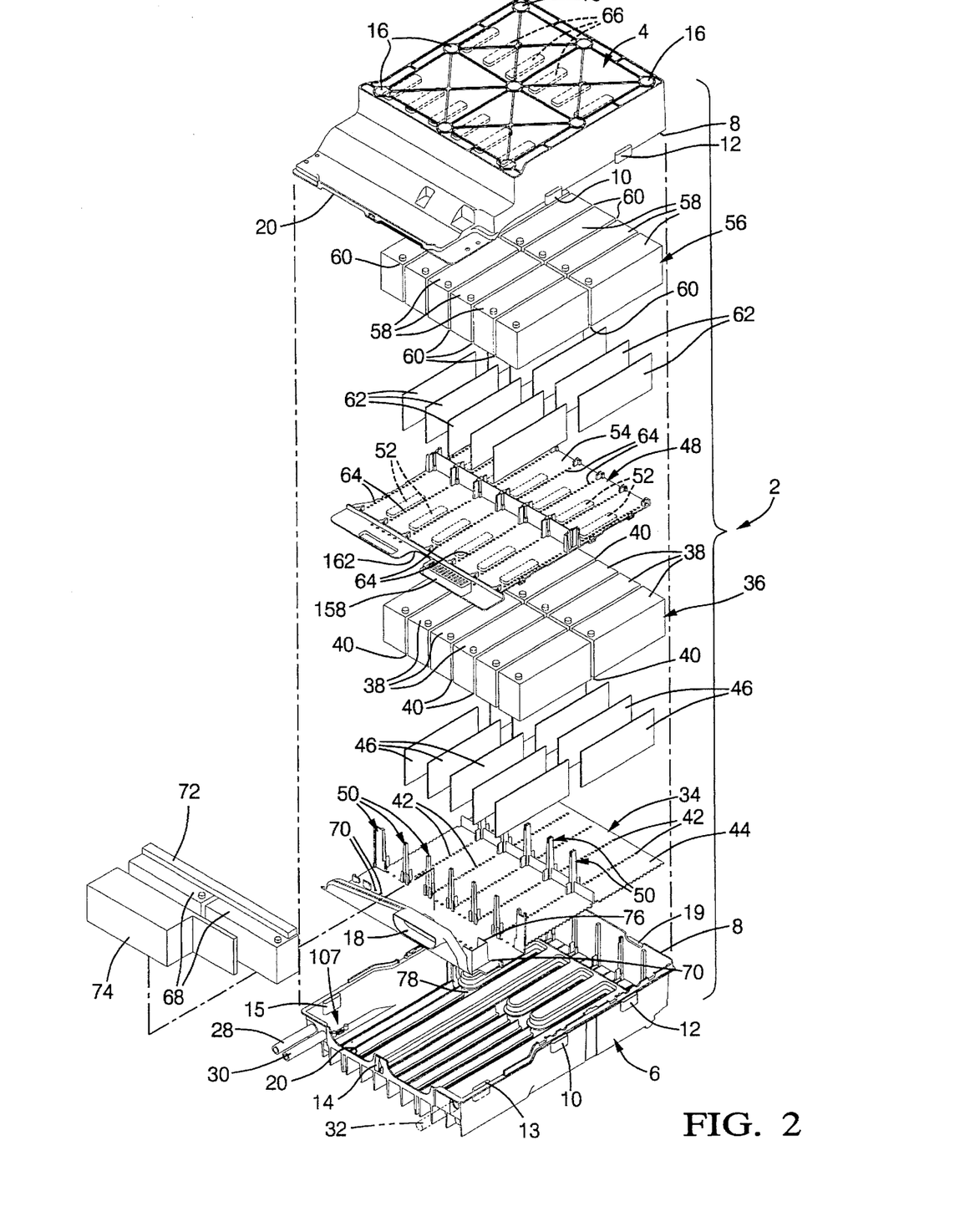
FIG. 2 is an exploded perspective view of the battery pack and housing in accordance with the present invention.

FIG. 2 is an exploded view of the housing 2 and the innards thereof as shown. The other Figures are enlargements of the principle components of the pack. A first tray 34 (see FIG. 4) rests atop pedestals 84, 86, 88 projecting from the floor 78 of the lower part 6 (see FIG. 3) of the housing 2. The pedestals will preferably be in the form of elongated ribs 84, 86 and 88 which not only strengthens and rigidifies the housing, but direct the air flow along the bottom of the housing for uniform upward movement thereof through the modules. The lower part 6 and first tray 34 will be discussed in more detail in conjunction with FIGS. 3, 4 and 7.

A first tier 36 of battery modules 38 rests atop the first tray 34, which modules 38 are separated one from the other by heat transfer gaps 40. A plurality of openings 42 in the deck 44 of the first tray 34 are each aligned with the gaps 40. For narrow battery modules 38 and accordingly relatively wide gaps 40 (e.g., about 25 mm), baffles 46 will preferably be positioned in the gaps 40 to separate the several modules 38 one from the other so as to better control and distribute the air passing through the gap 40 via the openings 42. Wider modules, and hence narrower gaps (e.g., about 10 mm), do not require such baffles 46 for effective heat transfer.

A second tray 48 rests atop stanchions 50 extending from, and preferably integral with, the first tray 34, (see FIG. 7) and bears down on the tops of the modules 38 via resilient foam pads 52 secured (e.g., glued) to the underside of the deck 54 of the second tray 48. The foam pads compressively hold the modules 38 in place without the need for cumbersome separate fasteners, hold downs or the like to hold the modules in place. Battery modules 58 in the second tier 56 are separated one from the other by spacings 60, and are supported on the second deck 54 of the second tray 48. As with the lower tier 36 of modules 38, baffles 62 may optionally be included in the spaces 60 to provide better flow of air between narrow modules which are spaced further apart. Holes 64 in the deck 54 are aligned with the openings 42 in the deck 44 on the underlying first tray 34 so that air passing upwardly through the openings 42 and gaps 40 will pass upwardly through the holes 64 and into the space 60 between the battery modules 58 for cooling/heating thereof (i.e., depending on the temperature of the air).

Figure 7:
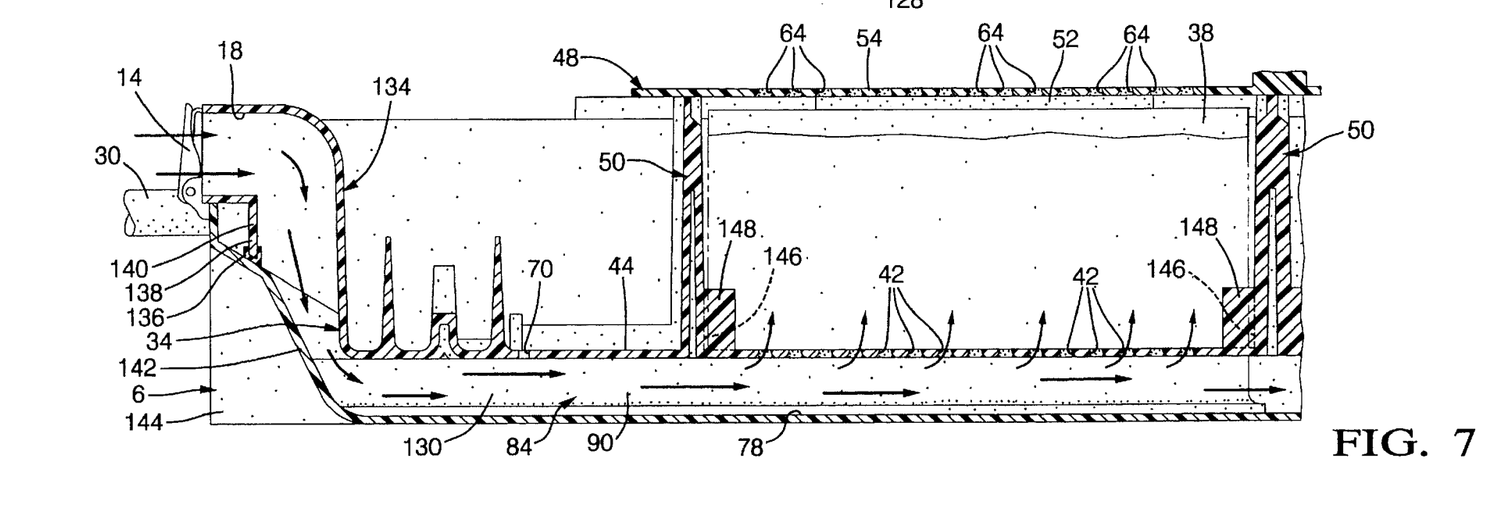
FIG. 7 is a sectional view of the first tray positioned in the lower part of the battery pack housing of FIG. 1.

As seen in FIG. 7, the air enters the housing 2 through an inlet 18, passes beneath the first tray 34 into a plenum 130 and then upwardly through the openings 42 and holes 64 into the cover 4 of the housing 2 from whence it exhausts through an exhaust port 20. Resilient foam pads 66 on the underside of the cover 4 bear down on the tops of the battery modules 58 and compressively hold them in place vertically on the tray 48 without the need for cumbersome separate fasteners, hold downs or the like to hold the modules in place.

Two additional battery modules 68 may be provided at the end of the tray 34 adjacent the inlet 18 in order to provide the requisite system voltage, and may or may not be needed depending on voltage of each module. Openings 70 in the deck 44 of the tray 34 are provided for admitting air to either side of the additional battery module(s) 68. A strip of gasket material 72 lies atop the battery module 68 for sealing off the underside of the deck 54 of the tray 48 to prevent leakage and insure proper flow of air upwardly through the holes 64. An automatic disconnect and electronic control package 74 is positioned in a pocket 76 on the first tray 34 for monitoring the condition of and controlling the battery pack in response to such parameters as current, voltage, and temperature which are sensed by various sensors strategically located throughout the battery pack. The output from the control package 74 is fed outside the housing 2 via a wiring harness 32, and routed to wherever it is needed in the vehicle or conditioning device 22 to control, or provide information about the condition of, the battery pack.

Figure 3:
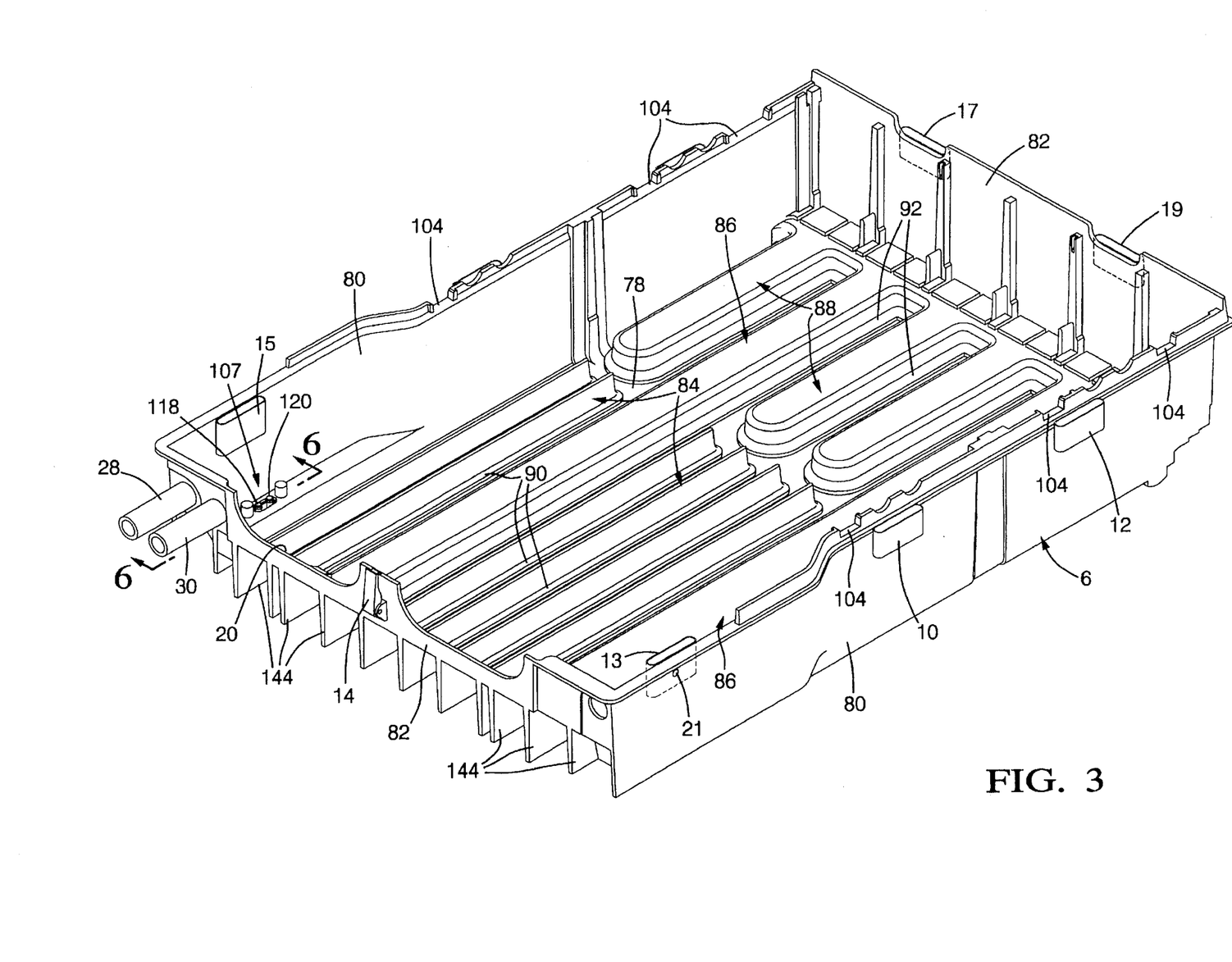
FIG. 3 is a perspective view of the lower part of the battery pack housing of FIG. 1.

FIG. 3 shows the lower part 6 of the battery pack housing 2. The lower part 6 comprises a floor 78 defined by upstanding side walls 80 and end walls 82, and has a plurality of upstanding pedestals, preferably in the form of ribs 84, 86 and 88, upstanding therefrom for supporting the first tray 34 thereon. While bosses or columnar pedestals would also be effective, rib-like pedestals add stiffness and impact resistance to the housing which is desirable for vehicular application. The wider ribs 86 extend the full length of the lower part 6 and define channels on the undersides thereof for receiving support members from a cradle (not shown) used to support the battery pack in a vehicle. The ribs 84 and 86 define a plurality of channels 90 therebetween for directing the flow of air from the inlet 18 in the plenum 130 formed between the floor 78 and the first tray 34. The wider, shorter ribs 88 at the ends of the narrower longer ribs 84, serve to break up the flow of air emanating from the channels 90 and direct it into the channels 92 at the end of the lower part 6 remote from the inlet 18. This serves to redistribute the air near the end of the plenum 130 and prevent a greater flow of air through the openings 42 at the end of the plenum 130 then through the other openings 42 nearer the inlet 18, so that all air flowing upwardly from the plenum 130 through the openings 42 will flow be at substantially the same rate. Notches 104 in the side walls 80 and are adapted to receive complimentary projections 106 depending from the edges of the second tray 48.

Figure 6:
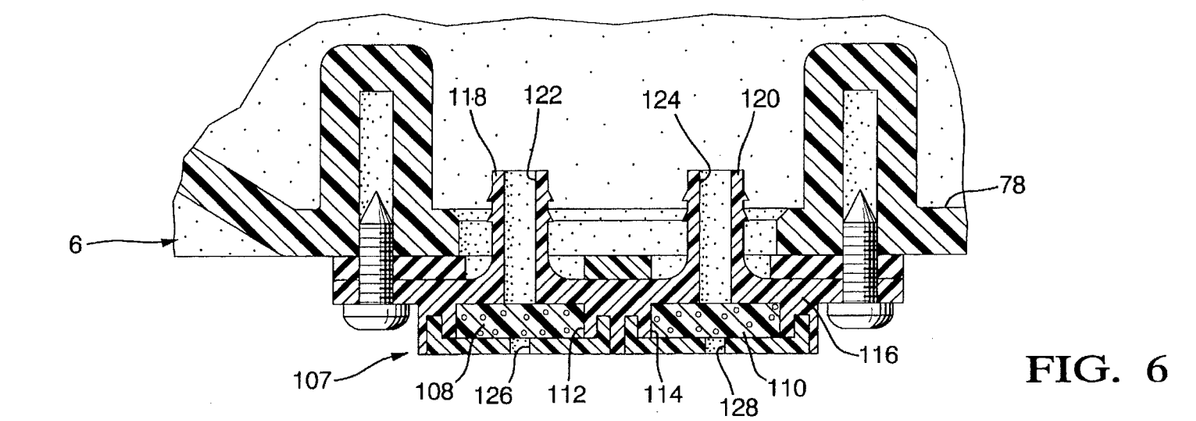
FIG. 6 is a sectional view in the direction 6—6 of FIG. 3.

The several battery modules 38 and 58 will each be vented to the atmosphere via a network of tubing which directs the battery gases (i.e., $H_2$) to vents from the housing 2. The vents comprise a flame arrestor assembly 107 located in the floor 78 of the lower part 6. As best shown in FIG. 6, the flame arrestor assembly 107 includes two microporous flame arrestor filters 108 and 110 positioned in pockets 112 and 114 in the molding 116. Fittings 118 and 120 of the molding 116 have bores 122 and 124 therein. The tubing from the modules in the different tiers are connected to fittings 118 and 120 to vent the gases through the bores 122 and 124 to the flame arrestors 108 and 110 and ultimately to the ambient via ports 126 and 128.

Figure 4:
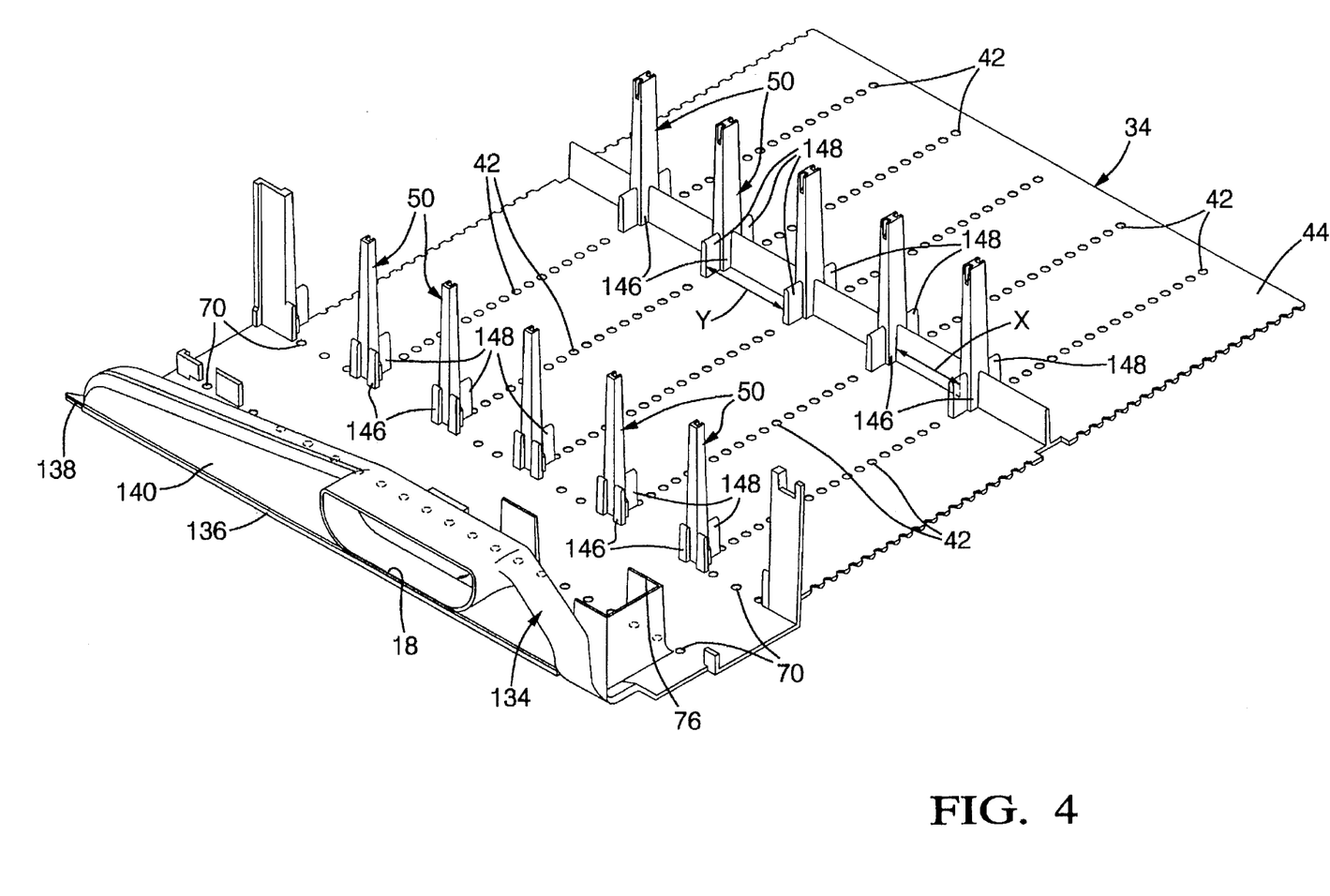
FIG. 4 is a perspective view of the lower (first) tray for supporting the first tier of battery modules in the battery pack housing of FIG. 1.

FIG. 4 best depicts the first tray 34. This tray 34 rests atop the ribs 84, 86 and 88 on the floor 78 to define the plenum 130 (see FIG. 7) in the bottom part 6. The first tray 34 includes a first deck 44 on which the battery modules 38 rest with the gaps 40 therebetween in alignment with the plurality of openings 42 which open to the underlying plenum 130 for admitting forced air to the gaps 40. The openings 42 will be sufficient in size and number to accommodate an air flow rate of about 250–300 CFM through the housing 2. Two additional rows of openings 70 are provided adjacent the inlet 18 for cooling the battery modules 68 (see FIG. 2). A plurality of upright stanchions 50 extend between the first tray 34 and the second tray 48 and serve to support the second tray 48 slightly above the tops of the battery modules 38. The stanchions 50 are preferably molded integrally with the deck 44 of the first tray 34. The roots or bases 146 of the stanchions 50 are spaced apart by a distance $\underline{X}$ equal to about the width of the narrower battery modules. Projections 148 extend outwardly from the roots 146 of the stanchions 50, and have a distance $\underline{Y}$ therebetween which is equal to about the width of the wider battery modules. Hence, the bases 146 or projections 148, as appropriate, serve to prevent lateral shift of the modules in the tray(s) and thereby maintain the gaps 40 and spaces 60 between the modules 38 and 58 respectively. Resilient foam pads 52 glued to the underside of the second tray 48 engage the tops of the battery modules 38 to compressively hold them in place on the first tray 34. The inlet 18 opens into a manifold 134 (see FIG. 7) which directs the air into the plenum 130 beneath the first tray 34 and upwardly through the plurality of openings 42 betwixt and between the battery modules 38. The manifold 134 will preferably be a one piece molding molded integrally with the tray 34, but may comprise two or more pieces secured and sealed together and to the tray 34. A resilient gasket 136 is affixed to the edge 138 of the wall 140 defining the manifold 134 to prevent air leakage at the wall 142 of the lower housing part 6. A plurality of ribs 144 project outwardly from the wall 142 at the front of the housing 2 stiffen and strengthen the lower housing part 6 against frontal impact in an accident.

Figure 5:
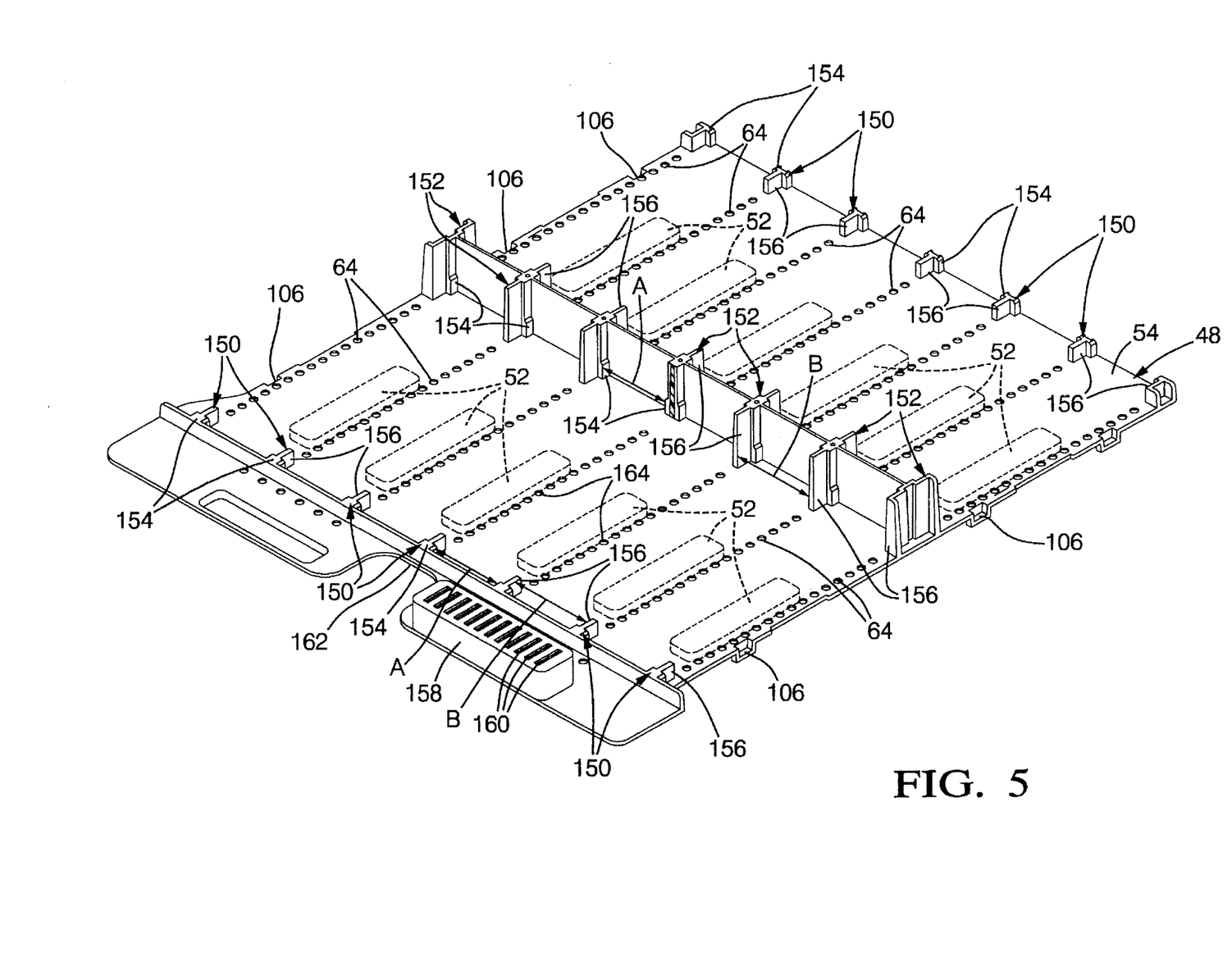
FIG. 5 is a perspective view of the upper (second) tray for supporting the second tier of battery modules in the battery pack housing of FIG. 1.

The second (i.e., upper) tray 48 is best shown in FIG. 5, and includes a deck 54 and a plurality of holes 64 therein which are aligned with the openings 42 in the first (i.e., lower) tray 34 when the tray 48 is properly positioned in the housing 2. A plurality of resilient foam pads 52 are glued to the underside of the deck 54 for engaging the tops of the battery modules 38 to compressively hold them in position on the first tray 34. Upright keepers 150 and 152 serve to engage the bottoms of the battery modules 58 which rest upon the deck 54. The keepers 150 and 152 have a thicker portion 154 and a thinner portion 156. The distance A between the thicker portions 154 conforms substantially to the width of the widest battery module 58, while the distance $\underline{B}$ between the thinner portions 156 conforms substantially to the width of the widest battery module 58 in the battery pack. A snap on cap 158 houses a fuse and shunt assembly (not shown), and includes a plurality of slots 160 therein to prevent excessive heat build up beneath the cap 158. A cutout 162 at the edge of the tray 48 allows the heavy duty cables used to connect the top tier of batteries 56 to the lower tier 36 thereof to pass through.

In addition to providing substantially uniform heating/cooling of all the battery modules in the pack, the present invention incorporates many design features molded integrally into the major components of the assembly (i.e., lower part, trays and cover). As a result, the number of parts requiring manufacture and assembly is reduced. This also permits ease/speed of assembly and ready access to any of the battery modules for maintenance without having to disassemble a number of parts, hold downs, fasteners or the like otherwise typically utilized in battery packs. With the design of the present invention, once the housing 2 is opened, all of the remaining components (e.g., trays, modules, partitions, baffles, etc.) may simply be lifted out of the way to provide access to the underlying modules or other components of the pack that need service/maintenance.

While the invention has been disclosed primarily in terms of certain specific embodiments thereof it is not intended to be limited thereto but rather only to the extent set forth hereafter in the claims which follow.

What is claimed is:

1. A battery pack comprising:

a plurality of individual battery modules stacked in first and second tiers one atop the other;

a substantially closed housing enclosing said modules said housing having a lower part supporting said modules and a cover overlying said modules;

a floor at the bottom of said lower part;

a plurality of pedestals upstanding from said floor;

a first tray supported on said pedestals and together with said floor defining a plenum for conducting a heat transfer fluid beneath said first tray, said first tray including a first deck supporting said first tier of modules;

a gap between adjacent modules in said first tier;

a plurality of openings in said first deck each communicating said plenum with a said gap for passing said heat transfer fluid upwardly through said gap from said plenum;

a second tray overlying said first tier of modules, said second tray including a second deck supporting said second tier of modules;

a space between adjacent said modules in said second tier;

a plurality of holes in said second deck each communicating a said space with an underlying said gap for passing said heat transfer fluid upwardly through said space from said gap;

an inlet to said housing for admitting said heat transfer fluid into said plenum; and an outlet from said housing for exhausting said heat transfer fluid from said housing after it has passed through said second tier of modules.

2. A battery pack according to claim 1 wherein said pedestals comprise ribs which extend in a first general direction along said floor to stiffen said housing and direct said heat transfer fluid beneath said first tray in said first general direction.

3. A battery pack according to claim 1 wherein said first tray is positioned in said lower part of said housing.

4. A battery pack according to claim 1 including a plurality of stanchions extending between said first and second trays for supporting said second tray on said first tray.

5. A battery pack according to claim 4 wherein said stanchions are integral with said first tray.

6. A battery pack according to claim 1 wherein said inlet to said housing is coupled to an outlet from a fan, and said outlet of said housing is coupled to an inlet to said fan for recirculating said heat transfer fluid through said housing.

7. A battery pack according to claim 1 including at least one resilient pad compressed between said second tray and a said module in said first tier.

8. A battery pack according to claim 1 including at least one resilient pad compressed between said upper part of said housing and a said module in said second tier.

9. A battery pack according to claim 1 including a plurality of baffles extending between said stanchions in said gap so as to separate said modules in said first tier one from the next, said openings lying on both sides of said baffles for directing said heat transfer fluid between said baffles and adjacent said modules.

10. A battery pack according to claim 9 including a plurality of partitions in said space so as to separate said modules in the second tier one from the next, said holes lying on both sides of said baffles for directing said heat transfer fluid between said partitions and adjacent said modules.

11. A battery pack according to claim 1 including a one-piece manifold integrally molded with said first tray for conducting said heat transfer fluid from said inlet into said plenum.

* * * * *